United States Patent [19]

Rach et al.

[11] Patent Number: 4,696,333
[45] Date of Patent: Sep. 29, 1987

[54] RIM FOR A PNEUMATIC VEHICLE TIRE

[75] Inventors: Heinz-Dieter Rach, Garbsen; Udo Frerichs, Langenhagen, both of Fed. Rep. of Germany

[73] Assignee: Continental Gummi-Werke Aktiengesellschaft, Hanover, Fed. Rep. of Germany

[21] Appl. No.: 856,587

[22] Filed: Apr. 25, 1986

[30] Foreign Application Priority Data

Apr. 27, 1985 [DE] Fed. Rep. of Germany ....... 3515320

[51] Int. Cl.$^4$ ............................................. B60C 17/04
[52] U.S. Cl. .................. 152/379.3; 152/380; 152/DIG. 20; 152/516; 152/520
[58] Field of Search .............. 152/DIG. 20, 379.3, 152/379.4, 379.5, 380, 516, 520, 158

[56] References Cited

U.S. PATENT DOCUMENTS

| | | | |
|---|---|---|---|
| 2,844,180 | 7/1958 | Omeron | 152/520 X |
| 4,169,496 | 10/1979 | Cataldo | 152/379.3 |
| 4,257,467 | 3/1981 | Van der Burg | 152/158 |
| 4,563,042 | 1/1986 | Seitz et al. | 152/380 X |
| 4,597,426 | 7/1986 | Mauk et al. | 152/380 X |

Primary Examiner—Robert B. Reeves
Assistant Examiner—Russell D. Stormer
Attorney, Agent, or Firm—Becker & Becker, Inc.

[57] ABSTRACT

A rim for a pneumatic vehicle tire, the beads of which are adapted to be mounted on the radially inner periphery of the rim. The rim has a rim ring that is provided radially inwardly with seating surfaces for the tire beads. On the lateral edges, the rim ring has essentially radially inwardly extending rim flanges. Furthermore, the rim ring is provided radially outwardly with support surfaces for emergency operation when a puncture, flat tire, etc. is encountered. In order to increase the ability to operate with a flat tire, the wall of the rim ring, in the vicinity of each of the rim flanges, is bent radially outwardly, and is then bent back axially inwardly at a radial spacing relative to the remainder of the rim ring, so that two annular supports are formed for supporting a flat tire.

8 Claims, 2 Drawing Figures

RIM FOR A PNEUMATIC VEHICLE TIRE

BACKGROUND OF THE INVENTION

The present invention relates to a rim for a pneumatic vehicle tire, the beads of which are adapted to be mounted on the radially inner periphery of the rim. The rim has a rim ring that is provided radially inwardly with seating surfaces for the tire beads. On the lateral edges, the rim ring has essentially radially inwardly extending rim flanges. Furthermore, the rim ring is provided radially outwardly with support surfaces for emergency operation when a puncture, flat tire, etc. is encountered.

A vehicle wheel having such a rim is disclosed in U.S. patent application No. 720,054, filed Apr. 5, 1985, which belongs to the assignee of the present application. A similar vehicle wheel is disclosed in U.S. Pat. No. 4,597,426, and also belonging to the assignee of the present application. The rims of these two known vehicle wheels essentially differ in that with the first one, a recessed mounting portion (deep bed) is provided for the tire on the radially inner periphery, whereas the second referenced vehicle wheel gets by without a deep bed due to the eccentric mounting of the bead cores in the tire beads. Common to both of these known vehicle wheels is that the wall of the rim ring, which forms seating surfaces for the tire on the radially inner side, serves on the radially outer side as a support surface for the tire during an emergency operation situation, such as when the tire has been punctured or is otherwise underinflated.

Unfortunately, the aforementioned known configuration of the rim can lead to drawbacks when using tires having a constantly smaller cross-sectional area, with the spring deflections becoming smaller. In extreme situations, punctures or other breakdowns can occur that inherently include the danger of damage to the rim ring, and hence to the seating surfaces for the tire. Furthermore, due to the rigidity and unyielding characteristic of the rim ring, it is not possible to provide for an emergency operation to the extent that one would desire.

It is therefore an object of the present invention to provide a rim that does not have the aforementioned drawbacks, and with which it is possible, in particular, to achieve an improvement or expansion of the ability to operate the tire when the latter is no longer properly inflated.

BRIEF DESCRIPTION OF THE DRAWINGS

This object, and other objects and advantages of the present invention, will appear more clearly from the following specification in conjunction with the accompanying schematic drawing, in which.

SUMMARY OF THE INVENTION

The rim of the present invention is characterized primarily in that the wall means or wall of the rim ring, in the vicinity of each of the rim flanges, is bent radially outwardly and then is bent back axially inwardly at a radial distance to the remainder of the rim ring, so that two annular supports are formed for the tire to support the latter when it is no longer properly inflated.

As a result of the inventive configuration of the rim ring in the region of the annular supports for a flat tire, the advantage of a spring effect is achieved, so that when a breakdown occurs during normal driving operation, and also when operating with a flat tire, the zenith portion of the rim and of the tire are subjected to considerably less stress. With regard to operation with a flat tire, the result is that one can drive considerably greater distances with an underinflated or flat tire without causing permanent damage to the tire. A further advantage is that the support surfaces on the annular supports for a flat tire are separate from the bead seating surfaces on the rim, so that even if the support surfaces are damaged due, for example, to a severe puncture, a secure seating of the tire beads on the rim remains assured. Furthermore, due to the increased radial spacing between the rim seating surfaces and the support surfaces, the tire is pressed in less when it is operated while flat, thus also leading to an increase of the service life of the tire.

Due to the inventive configuration of the rim ring, especially in the region of the bent rim flanges, the inherent rigidity is increased to such an extent that a rim wall thickness that is approxiately two-thirds of that of the known rim rings suffices. As a result, despite the provision of the annular supports for a flat tire, on the whole there is no increase in weight of the inventive rim compared with known rims. Thus, without changing the total weight of the vehicle wheel, there is obtained an overall improvement in driving comfort, an increase in the comfort of operation with a flat tire, as well as an increase in the ability to operate with a flat tire and of the service life of the tire and the rim.

Further advantageous features of the present invention will be described in detail subsequently.

DESCRIPTION OF PREFERRED EMBODIMENTS

Figure 1:
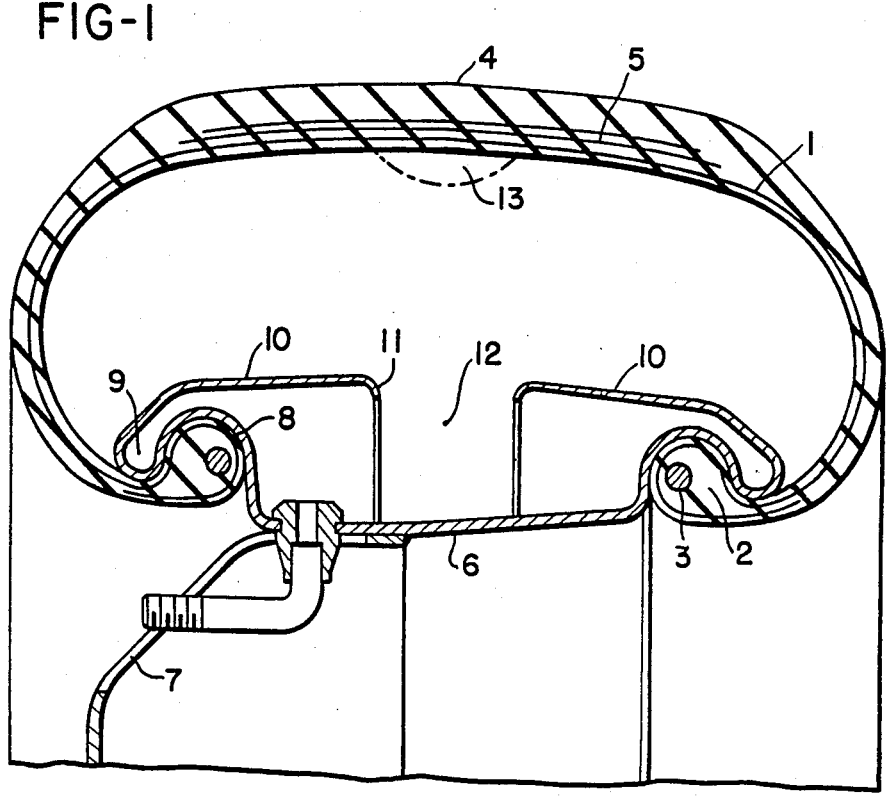
FIG. 1 is a partial radial section through a wheel and tire assembly for a vehicle showing one inventive embodiment of a rim where the seating surfaces for the tire beads have an approximately semi-circular cross section.

Referring now to the drawing in detail, with the embodiment of a wheel and tire assembly for a vehicle illustrated in FIG. 1, the tire, which essentially comprises rubber or rubber-like synthetic materials, has a carcass 1 that is anchored to the beads 2 by being looped around pull resistant and compression resistant bead cores 3. A conventional reinforcing belt 5 is disposed between the tread 4 and the carcass 1.

The preferably one-piece rim is provided with a rim ring 6 that has an approximately cylindrical shape in the central portion of the rim. The rim ring 6 is secured in a customary manner to a rim well 7. Toward the axially outer sides, the rim ring 6 passes into rim seating surfaces 8 for the tire beads 2; in this embodiment, the seating surfaces 8 have an approximately semi-circular cross section. Axially outwardly from the seating surfaces 8 are disposed rim flanges 9 which are formed by bending the rim ring wall (wall means) radially outwardly.

The wall means of the rim ring 6 does not end at the rim flanges 9, but rather is bent back axially inwardly in such a way as to be spaced radially outwardly from the remainder of the rim ring; thus, the wall of the rim ring 6 forms two annular supports 10 for a flat or otherwise underinflated tire. The axially inner edges 11 of the annular supports 10 can be bent back radially inwardly. The axial spacing between the two edges 11 is preferably such that the space disposed between them can serve as a drop center 12 for mounting a tire. It is advantageous to embody the annular supports 10 in such a way that their diameter increases axially inwardly, and their thickness decreases in this direction. The overall rim ring 6, including the annular supports 10, is preferably made of steel plate, with its thickness being approximately two-thirds of the thickness of conventional drop-center rims. If necessary, the rim can, of course, also be made of some other material, such as aluminum sheet metal.

When a breakdown occurs, for example due to the air pressure being too low, or when a flat-tire-operation is encountered, i.e. operation is undertaken with tires that are not inflated, the zenith portion of the tire rests upon the emergency annular supports 10, which, due to their configuration, can resiliently yield to a certain extent, resulting in less stress of the rim ring 6 and of the tire. If necessary, it can be advantageous to provide the inner side of the tire, in the central region, with a continuous or interrupted member 13 that drops into the drop center 12 during an emergency operation, thus imparting a lateral guidance to the tire.

Figure 2:
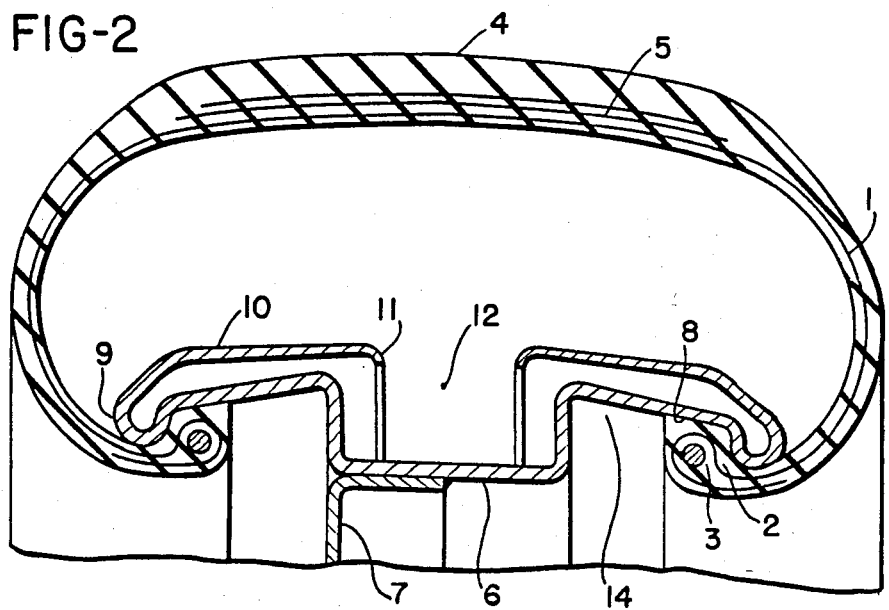
FIG. 2 is a partial radial section through a wheel and tire assembly for a vehicle showing another inventive embodiment of a rim that is provided on the radially inner periphery with a recessed mounting portion for the tire beads.

The embodiment of a wheel and tire assembly for a vehicle illustrated in FIG. 2 corresponds essentially to the embodiment of FIG. 1. The only difference is that a deep bed or recessed mounting portion 14 is disposed on the radially inner periphery of the rim ring 6 next to each of the seating surfaces 8 for the tire beads 2, so that it is also possible to mount a tire having bead cores 3 that are not mounted eccentrically in the beads 2.

The present invention is, of course, in no way restricted to the specific disclosure of the specification and drawing, but also encompasses any modifications within the scope of the appended claims.

What we claim is:

1. A rim of pneumatic vehicle tire, the bends of which are adapted to be mounted on the radially inner periphery of the rim; said rim comprises:
  a rim ring that includes wall means and that is provided with seating surfaces on the radially inward side for said tire beads; axially outwardly of said seating surfaces, said wall means of said rim ring is bent to form respective rim flanges that extend essentially radially inwardly; said rim flanges then being bent axially inwardly and then radially outwardly, and then, at a radial spacing from the bead seating surfaces of said rim ring, said rim flange extends axially inwardly, so that two annular support surfaces are provided for supporting said tire when the latter is no longer properly inflated.

2. A rim according to claim 1, in which, inwardly of said rim flanges, said annular support surfaces are spaced from one another by a distance corresponding to the width of a conventional drop center.

3. A rim according to claim 1, in which the thickness of said wall means of said rim ring is approximately two thirds the thickness of a conventional drop-center rim.

4. A rim according to claim 1, in which the thickness of said wall means of each of said annular support surfaces decreases in an axially inward direction from said rim flange.

5. A rim according to claim 1, in which the diameter of each of said annular support surfaces increases in an axially inward direction from said rim flange.

6. A rim according to claim 1, in which said rim ring is made of steel plate.

7. A rim according to claim 1, in which each of said rim seating surfaces for said tire beads has an approximately semicircular cross section.

8. A rim according to claim 1, in which said rim seating surfaces for said tire beads extend at least approximately parallel to the axial direction of said rim, with a space for mounting said tire being provided axially inwardly of said seating surfaces.

* * * * *